Dec. 4, 1956 C. N. SPRANKLE 2,772,742
CEILING CONSTRUCTION
Filed July 12, 1954 2 Sheets-Sheet 1
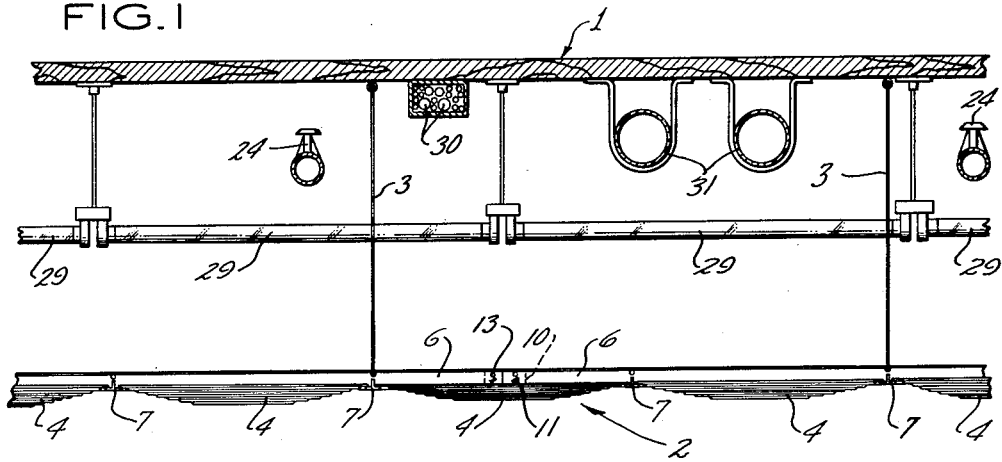
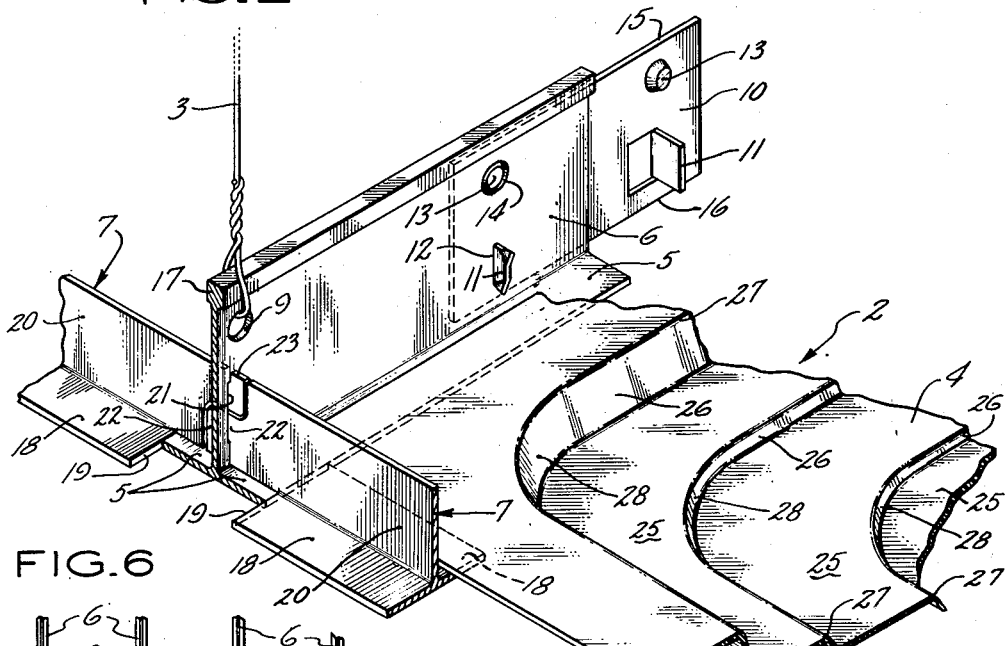
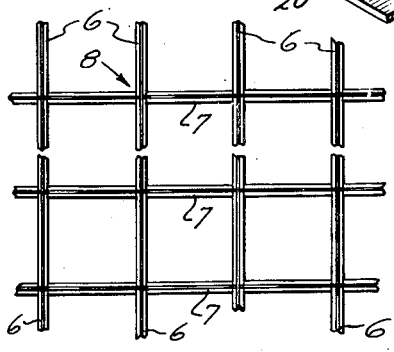
INVENTOR
CORTES N. SPRANKLE
BY Bates & Willard
ATTORNEYS Dec. 4, 1956     C. N. SPRANKLE     2,772,742
CEILING CONSTRUCTION Filed July 12, 1954     2 Sheets-Sheet 2

INVENTOR
CORTES N. SPRANKLE
BY Bates + Willard
ATTORNEYS

United States Patent Office 2,772,742
Patented Dec. 4, 1956

2,772,742
CEILING CONSTRUCTION

Cortes N. Sprankle, West Hartford, Conn., assignor to Plax Corporation, West Hartford, Conn., a corporation of Delaware Application July 12, 1954, Serial No. 442,532

10 Claims. (Cl. 169—1)

The present invention relates to translucent panel ceilings and more particularly to panel ceilings which are suspended below and conceal lighting fixtures, electric power and communications wiring, air conditioning conduits and ducts, piping for gas, water, and the like, or any of them.

An open space of substantial depth may be provided between a roof, upper floor or main ceiling from which the panel ceiling is suspended. Preferably the panels are supported by a suspended grid structure from which they are readily removed and in which they are readily replaced so as to provide easy access to the service lines in the normally concealed space above them and for cleaning. Moreover, it is desirable that the suspending grid assembly be sectionalized and readily removable or displaceable, in whole or in part, to provide even freer access to the service facilities. Preferably, replacement of the supporting grid structure and the panels is just as readily made. Thus, the unsightly service lines, while normally concealed, may be reached for maintenance, alteration, replacement or repair with a minimum of inconvenience and expense. With panels temporarily removed, lighting elements easily are replaced and relocation and repair is easy for conections to sanitary facilities, water taps and waste outlets, gas, electric, air conditioning outlets and the like in the space between the main and the suspended ceilings and to the rooms above and below the ceilings.

Suspended ceilings of this type are quickly and easily installed and may be subsequently modified to conform to relocation of walls without appreciable waste or expense.

Substantially overall shadowless lighting is obtainable rather than the shadow producing lighting generally characteristic of spaced lighting fixtures.

It is a general object of the present invention to provide an improved suspended ceiling assembly.

It is a further object to provide such a ceiling suitable for concealing automatic sprinkler units without reducing the effectiveness of the ceiling as a light diffuser or the effectiveness of the sprinklers.

A further object is to provide a suspended ceiling construction, including panel members having captured orientation stresses with dimensional stability below a critical temperature and instability above that temperature such that the captured orientation stresses released at the criticall temperature shrink the panels.

A further object is to provide sufficient orientation in the panels so that the panels shrink to a size which will not bridge the supporting grid structure when the orientation stresses are relieved while prior to unmolding shinkage the panels bridge and are supported by the grid.

Preferably the panels have a captured orientation stretch or stress of three to four times the unoriented length and width of the panels.

A further object is to provide improved suspended translucent panel members of the type described which are positively dislodged and removed from the supporting grid by activation of sprinkler discharge.

Another object is to provide in ceilings of the character described an improved panel having advantages of strength, light weight, shape stability, economy and manufacture over comparable panels heretofore used.

Other objects and advantages of the invention appear in the specification and are apparent from the accompanying drawings, in which:

Figure 1 is an elevation view partly in cross-section of a suspended ceiling assembly embodying the invention;

Fig. 2 is an enlarged perspective view of a portion of the suspended ceiling construction of Fig. 1 including a corner of a ceiling panel supported by suspended grid structure;

Fig. 6 is a plan view looking down on the ceiling assembly.

Figure 3:
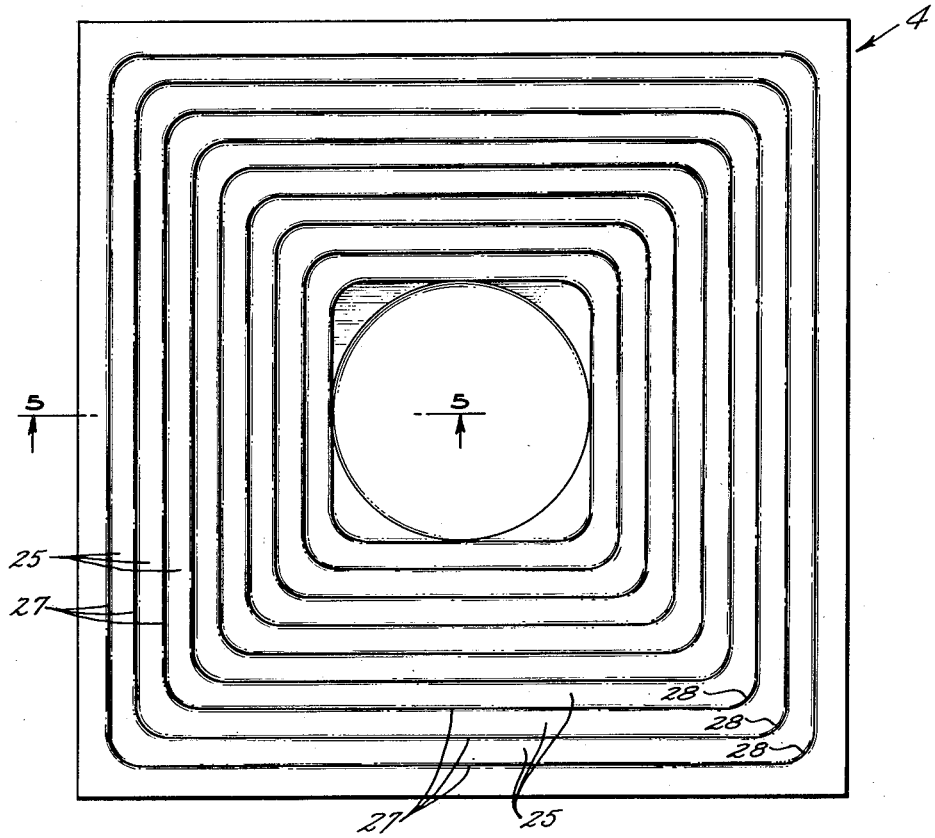
Fig. 3 is a plan view of a ceiling panel.

Referring generally to Fig. 1, there is shown a main ceiling generally designated 1 from which a lower ceiling, generally designated 2, is suspended by suitable suspension members, such as wires 3 or the like.

It will be understood that the main ceiling 1 is illustrative of any suitable supporting structure,, including roofing rafters or flooring, to which the supporting member 3 may be secured.

As shown in Figs. 1 and 2, the suspended ceiling 2 includes a plurality of translucent panels, generally designated 4, which are supported at their edges on narrow shelf portions 5 of member 6 and 7 which are interlocked at right angles to form a horizontal grid, generally designated 8 (Fig. 6), which is suspended at the lower ends of the wires 3.

Referring to Fig. 2, the grid members 6 and 7 there shown are illustrative of a preferred grid assembly 8. More particularly, the members 6 and 7 are formed of any suitable material, as for example aluminum, and have a generally T-shaped cross section so that when suspended, as shown in inverted positions, the arms provide the supporting shelves 5 for the panels 4. In the illustrated embodiment, the members 6 are spaced apart the width of the panels 4 and disposed horizontally in parallel. Holes or eyes 9 are provided in which to secure the suspending wires 3.

Two or more members 6 may be joined together to provide any required length. As shown in Figs. 1 and 2, a preferred coupling member 10 of generally rectangular shape includes a pair of spaced lug portions 11, 11 which are adapted to extend through correspondingly spaced and aligned slots 12, 12 in the abutting ends of grid members 6, 6. A twist of each lug secures it firmly in its slot 12 and firmly secures the abutting channel members 6 to the coupling 10. The coupling 10 also may be stamped or otherwise provided with spaced bosses 13 or other suitable locating projections which are adapted to fit within aligned holes 14 in the ends of the members 6 and further restrained the coupled members 6, 6 in proper alignment. If desired, the upper and lower edges 15 and 16, respectively, of the coupling 10 may snugly conform to the supporting surface of the shelf 5 and to a spaced shoulder 17 at the top of the inverted T member 6 so as further to assure proper alignment of the coupled members 6, 6.

As shown in Fig. 2, the ends of the grid members 7 are interlocked in alignment in the grid members 6. In the embodiment shown, the members 7 have T-shaped cross-sections similar to the members 6 and are suspended in inverted position between adjacent members 6 so that arms 18 of the members 7 provide support for the panels 4. The members 7 are identical.

As shown in Fig. 2, the cross-arm portions 18 at the ends of each member 7 is cut away so that edge 19 snugly abuts the outer edge of the shelf 5 of grid member 6 when the end of the upright portion 20 extends through and is interlocked within a vertical slot 21 in the member 6.

More particularly, one end of each member 7 has a downwardly opening hook portion, generally designated 22, and the other end has a similar upwardly opening hook portion 23. In assembling the grid members, a hook end 22 first is inserted in the slot 21 and lowered into interlocking engagement. Thereafter the hook 23 of another member 7 is inserted into the same slot 21 and the member 7 moved with a pivotal motion into interlocking engagement with the two members 7 providing in effect a continuous length on both sides of the member 6, as shown in Fig. 2.

When completely assembled, the grid 3 provides a checkboard support for the panels 4, as shown in Fig. 6, and with the panels provides the suspended ceiling 2.

It will be understood that grid construction other than that illustrated may be used to support the panels 4. Moreover, while the illustrated grid 8 is a checkboard of squares, it will be appreciated that the pattern may be varied to accommodate other than square panels 4 as, for example, rectangles, triangles, or other polyangular shapes.

In accordance with the present invention, the panels 4 preferably are formed of biaxially molecularly oriented thermoplastic polymer resin sheet. Methyl methacrylate and polystyrene are two organic polymers which have proved particularly suitable. Both of these polymers are available in sheet form having a molecular orientation or captured stretch of approximately 300 to 400% in each of the principal surface dimensions or ordinates of the sheet. Such sheet has a length and width three to four times the dimensions of the unoriented sheet and an area roughly 9 to 16 times the area of the unoriented sheet.

While biaxial orientation of the order mentioned is preferable, lesser biaxial orientation is contemplated for ceilings embodying the invention. However, biaxial orientation is necessary in an amount at least such that the dimensions of the panel 4 which bridge and are supported by the grid shelves 5 and 18 when oriented are insufficient to bridge and be supported by the shelves 5 and 18 when the orientation is released. Thus, when the panels are heated to orientation releasing temperatures, which are of the order of 200° F. and greater for methacrylate and styrene, the panels 4 shrink to a size which cannot bridge the grid supports and drop, thereby providing for discharge of water from sprinkler heads 24, through the grids 8, without interference from the panels 5. The sprinklers 24 may be set to operate at any desired temperature at or above or below the disorienting or transition temperature of the panels 4. Operating temperatures of the order of 165° to 185° F. normally will be found satisfactory.

In accordance with the present invention, panels 4 preferably are concavely shaped so as to hold water when supported in the grid. Preferably the capacity is sufficient to distort and dislodge the panel without disorientation and shrinkage of the panel material.

Figure 4:
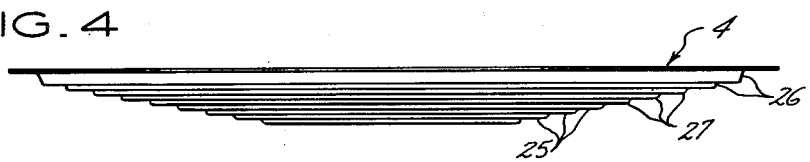
Fig. 4 is an elevation view of the panel shown in Fig. 3.
Figure 5:
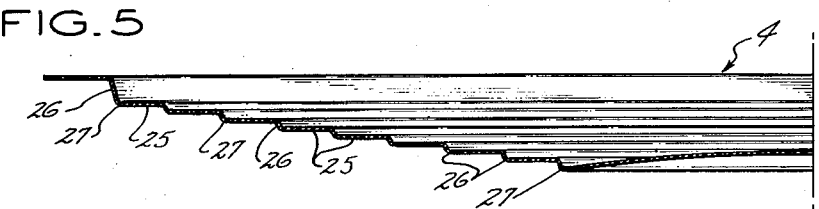
Fig. 5 is an enlarged cross-section view of the panel taken on line 5—5 of Fig. 3.

As shown in Figs. 3-5, a preferred construction for the panel 4 has a series of successively smaller, generally square, depressions which provide a series of flats 25 and risers 26 corresponding to the stairway treads and risers. The alternate flats 25 and risers 26 are connected by curved shoulders 27 and the adjacent flats 25 and risers 26 together with the shoulders 27, which are generally parallel to the edges of the panel, at each elevation are connected by curved corner portions 28.

The illustrated and described panel construction provides shape integrity and stability to the panel 4 when supported at its edges by the grid shelves 5 and 18.

The translucent panel ceiling 2 provided by the present invention, as shown in Fig. 1, preferably is suspended below and conceals lighting fixtures 29, electric power and communications wiring 30, air conditioning conduits and ducts (not shown) and piping 31 for gas, water, waste and the like, or any of them.

As shown in Fig. 1, an open space of substantial depth may be provided between the roof, upper floor or ceiling 1 from which the panel ceiling 2 is suspended. The panels 4 are readily removed from their suspending grid structure 8 so as to provide ready access to the service lines in the normally concealed space above them and for cleaning. Removal is effected by raising the horizontal panel 4 from the supporting grid shelves 5 and 18 and withdrawing the panel vertically through the diagonal of the grid opening. Replacement is readily effected by reversing the operation. The suspending grid assembly 8 being sectionalized is itself readily removed and replaced, in whole or in part, to provide even freer access to the service facilities. Thus the unsightly service lines, while normally concealed, may be reached for maintenance, alteration, replacement or repair with a minimum of inconvenience and expense. With panels 4 temporarily removed, lighting elements 29 easily are replaced. Relocation and repair of sanitary facilities, water taps and waste outlets, gas, electric, air conditioning outlets, and the like, in the space between the main and the suspended ceilings 1 and 2 and to the rooms above and below the ceilings is readily made.

Suspended ceilings 2 embodying the invention are quickly and easily installed and may be subsequently modified to conform to relocation of walls without appreciable waste or expense.

Substantially overall shadowless lighting is effected through the panels 4 rather than the shadow-producing lighting generally characteristic of individual lighting fixtures.

The present invention provides an improved suspended ceiling assembly 2 which conceals the automatic sprinkler units 24 without reducing the effectiveness of the ceiling or the sprinklers.

The invention further provides a suspended ceiling 2 including panels having dimensional stability below a critical temperature and instability above that temperature such that captured orientation stresses released at the critical temperature shrink the panels 4 which thereafter do not bridge the suspended grid shelves 5 and 18 which, prior to unmolding shrinkage, the panels bridge for support.

The invention further provides improved suspended translucent panel members 4 of shape integrity and stability which are positively dislodged and removed from the supporting grid 8 by water from activated sprinklers when not previously dislodged by unmolding.

Many modifications and adaptations of the embodiment of the invention shown and described will now be obvious or readily occur to those skilled in the art and I therefore do not wish to be limited to the details of the illustrative embodiment.

I claim:

1. A ceiling construction including a supporting structure and a ceiling supported by said structure, said ceiling being spaced from said supporting structure and defining an open cavity concealed by the ceiling, said ceiling comprising supporting grid members and a plurality of translucent light diffusing thermoplastic panels bridging the grid members and supported thereby, the plastic of said panels being biaxially molecularly oriented an amount such that relaxation of orientation shrinks the panel to a size which does not bridge and is not supported by the grid members.

2. The ceiling construction recited in claim 1 and wherein the panel is concavely shaped and has successive generally horizontal portions spaced by riser portions providing form integrity and stability.

3. The ceiling construction recited in claim 1 and including sprinkler units concealed in said open cavity between said supporting structure and said suspended ceiling.

4. A ceiling construction including a supporting structure and a ceiling supported by said structure, said ceiling being spaced from said supporting structure and defining an open cavity concealed by the ceiling, said ceiling comprising supporting grid members and a plurality of translucent lights diffusing thermoplastic panels bridging the grid members and supported thereby, the plastic of said panels being biaxially molecularly oriented an amount such that relaxation of orientation shrinks the panel to a size which does not bridge and is not supported by the grid members, said panel being concavely shaped and having successive flat portions spaced by riser portions and providing form integrity and stability, the edges of said concave panel resting on the grid members for support with the panel extending concavely downward below said edges and sprinkler units concealed in said cavity together with lighting elements and utility and service lines.

5. A ceiling construction including a plurality of translucent light-diffusing thermoplastic panels, the plastic of said panels being biaxially molecularly oriented an amount such that relaxation of orientation substantially shrinks the panel in size, and spaced means for supporting the oriented panels.

6. The ceiling recited in claim 5 and wherein said panels are concavely shaped.

7. The ceiling recited in claim 6 and wherein the panels each have successive generally horizontal flat portions connected by generally vertical riser portions for shape integrity and stability.

8. A ceiling construction including a supporting structure and a ceiling supported by said structure, said ceiling being spaced from said supporting structure and defining an open cavity concealed by the ceiling, said ceiling comprising supporting grid members providing supporting shelves for a plurality of translucent light-diffusing thermoplastic panels which bridge the grid shelves and are removably supported in horizontal position thereon, the plastic of said panel being biaxially molecularly oriented an amount such that relaxation of orientation shrinks the panel to a size which does not bridge and is not supported by the grid shelves, said panel when in a generally vertical position being removable and replaceable through said grid members.

9. A ceiling construction including a thermoplastic panel, the plastic of the panel being biaxially molecularly oriented an amount such that relaxation of the orientation substantially shrinks the area of the panel, and spaced means for supporting the oriented panel.

10. A ceiling construction including a supporting frame and a thermoplastic panel supported at the edge by the frame, and wherein the plastic of the panel is biaxially oriented an amount such that relaxation of the orientation responsive to heat shrinks the area of the panel out of edge supporting engagement with the frame.

References Cited in the file of this patent

UNITED STATES PATENTS

| | | |
|---|---|---|
| 1,169,210 | Walsh | Jan. 25, 1916 |
| 1,315,353 | Walsh | Sept. 9, 1919 |
| 1,465,452 | Matheney et al. | Aug. 2, 1923 |